United States Patent Office 3,483,431
Patented Dec. 9, 1969

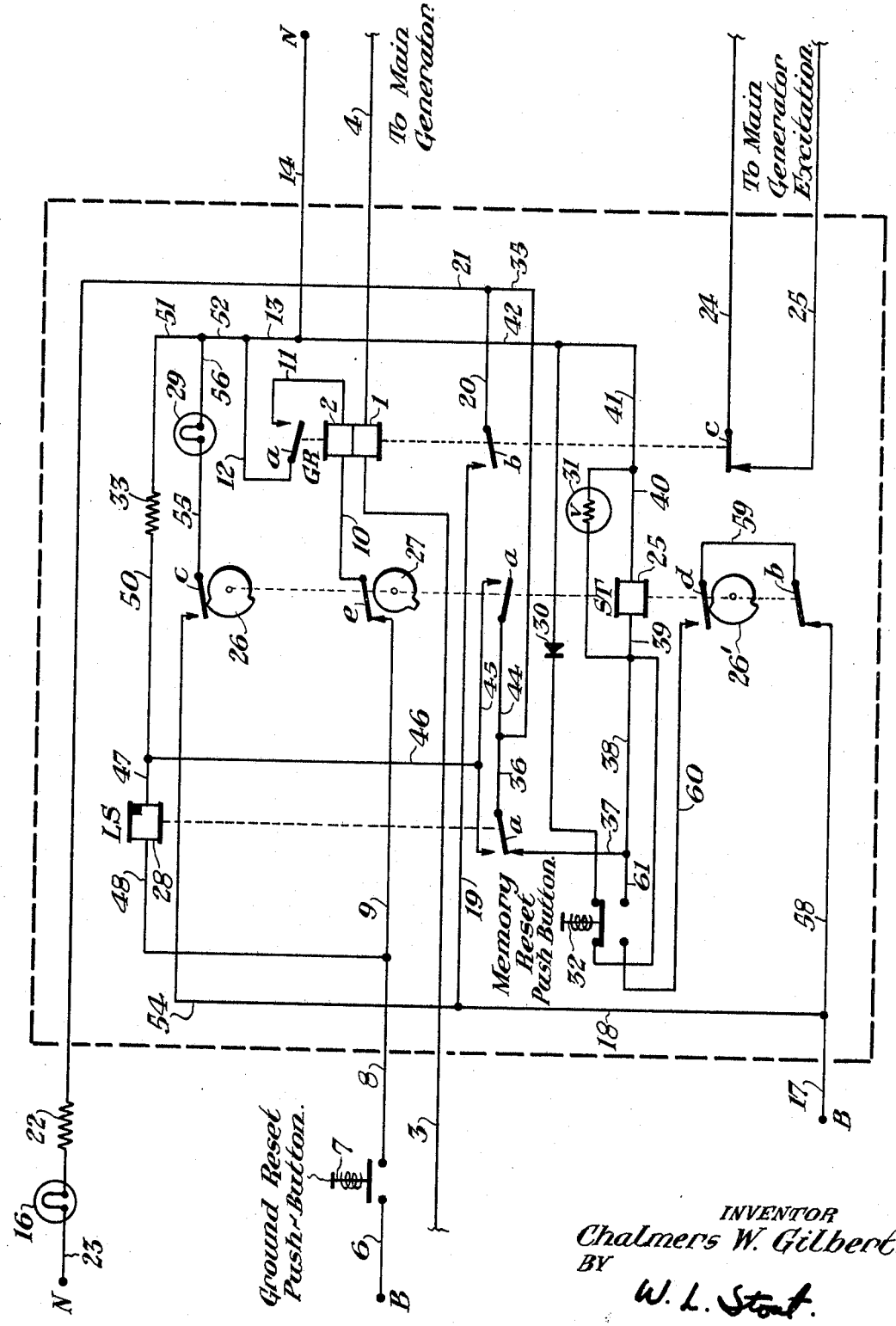

3,483,431
COUNTING AND LIMITING TYPE OF RESETTABLE GROUND DETECTION SYSTEM FOR DETECTING ELECTRICAL GROUND CONDITIONS
Chalmers W. Gilbert, Penn Hills Township, Allegheny County, Pa., assignor to Westinghouse Air Brake Company, Swissvale, Pa., a corporation of Pennsylvania
Filed Feb. 2, 1967, Ser. No. 613,507
Int. Cl. H02h 1/02, 5/00
U.S. Cl. 317—18                    19 Claims

ABSTRACT OF THE DISCLOSURE

In electrical apparatus having a resetable ground detector relay which actuates in response to the appearance of a ground condition and which may be reset upon the disappearance of the ground condition, a memory device for counting the numbers of ground conditions and for limiting the number of times the ground detector relay may be reset to a predetermined number of ground conditions.

My invention relates to a ground detection system and more particularly to a system for detecting, counting, indicating and limiting the number of ground conditions occurring on electrical equipment.

Normally, ground detection systems are commonly employed to protect electrical equipment against excessive electrical currents. For example, in diesel-electric locomotive systems a ground detector relay has been employed to detect the presence of grounds in the electrical system in order to avoid damage to electrical equipment and to prevent injury to attending personnel. Generally, these relays have been of the latching or stick type employing an actuating coil which is picked up by a ground condtiion and which may be released by energizing a reset coil which is manually controlled by a depressing push button switch. The activating of the ground detector relay lights an indication lamp and results in a relay action which restricts the Diesel engine to an idle speed. The ground detector relay is preferably a stay-where-put device and is so constructed that continuous energization of the actuating coil of the relay due to the presence of a permanent ground condition renders the reset coil ineffective in unlatching and resetting the relay. Accordingly, the engine will remain idling and will not respond to throttle changes during a permanent ground condition until maintenance personnel locate and correct the ground fault and reset the ground detector relay. However, the electrical systems of diesel-electric locomotives are also susceptible to intermittent ground faults which may appear as transient grounds. Previously, such transient grounds were generally tolerated and normally went unreported when they did not materially affect the normal operation of the diesel-electric locomotive. However, it has been emperically formulated that after the occurrence of a given number of intermittent ground conditions or transient grounds, it is desirable to initiate a lockout action which requires the attention of maintenance personnel since such repeated ground conditions are not only undesirable but also generally indicate the possibility of an ensuing serious problem or a deleterious electrical condition which could eventually prevent normal operation of the diesel-electric locomotive. Therefore, it is advantageous to exercise preventative maintenance measures by providing that the ground detector relay may not be reset after the occurrence of a given number of transient ground conditions. It has been found that such a program not only prevents serious and costly damage to the electrical equipment but also results in considerable savings due to the improved utilization of manpower and equipment which increases productivity. Further, it is evident that ground detection systems for locomotive applications must be small and simple in design, low in cost, easy to install and remove, reliable in use, undisturbed by shock and vibrations, immune to high voltage surges, unaffected by loss of power, and long-lived.

Accordingly, it is an object of my invention to provide a new and improved ground detection system.

A further object of my invention is to provide a small, replaceable, inexpensive and reliable ground detection system which is immune to surrounding shock and vibrations, is insensitive to high voltage surges, is unaffected by the loss of power, and is prossessed of long life.

Another object of my invention is to provide a ground detection system having a resetable ground detector relay and a memory device for counting and limiting the number of times the ground detector relay may be reset to a preselected number of ground conditions.

A still further object of my invention is to provide a ground detection system having a resetable ground detector relay for detecting the presence of ground conditions and having a stepping relay for counting the number of ground conditions and limiting the number of times the ground detector relay may be reset in accordance with a preselected number of ground conditions.

Yet another object of my invention is to provide a ground detection system having a resetable ground detector relay and having a resetable memory device for counting the number of ground conditions and rendering the resetable ground detection relay ineffective after the occurrence of a preselected number of ground conditions.

A still further object of my invention is to provide a resetable memory means including a stepping relay and a polar sensitive reed relay for counting, indicating and limiting the number of times a resetable ground detector relay may be reset in accordance with a preselected number of ground conditions.

Still yet another object of my invention is to provide a resetable memory device for a ground detector system having a resetable ground detector relay for detecting the presence of a ground condition, an arc suppressed stepping relay for counting and limiting the number of times the ground detector relay may be replaced, and a magnetic stick reed relay for preventing false ground counts and for assisting in the prevention of loss of memory due to electrical power failure.

Other objects and further advantages of my invention will become apparent to those skilled in the art as the description proceeds.

In brief, the objects of my invention are achieved by providing a resetable memory device for a ground detection system having a resetable ground detector relay. The memory device includes an electromagnetic stepping relay for counting and limiting the number of times the ground detector relay may be reset in accordance with a preselected number of ground conditions. The memory device also includes a polar sensitive reed relay for protecting the stepping relay against false ground counts and for supplementing the retention of memory count during electrical power failure. An "off" normal indicating device is utilized for signifying the occurrence of at least one ground condition, and an arc suppressing diode and varistor are employed for preventing and providing self-stepping of the stepping relay during its normal and recycling operations, respectively.

I shall describe one form of the ground detection system embodying my invention, and shall then point out the novel features thereof in the appended claims.

My invention will be better understood after a consideration of the following detailed description taken in connection with the accompanying drawing, which is a schematic diagram of the preferred embodiment of my invention.

Referring to the single figure of the drawing, the ground detection system illustrated includes a resetable ground detector relay GR, which may be of the type shown and described in the copending application for Letters Patent of the United States, Ser. No. 577,699, filed Sept. 7, 1966, by Earl R. Callender, for Electromagnetic Latching Relay, now Patent No. 3,396,351, issued Aug. 6, 1968, which is assigned to the assignee of the present application. The ground detector relay GR comprises a first operating or actuating coil 1 and a second operating or reset coil 2, the function and operation of which are described in greater detail in the above application. Energization of the coil 1 causes the ground detector relay to be picked up and to be mechanically latched in its operated position. On the other hand, the energization of the coil 2, assuming that coil 1 is no longer energized, causes the ground detector relay GR to become unlatched and released to its unoperated position. The ground detector relay GR and the other associated apparatus either may be unitarily packaged and form an integral part of the present ground detection system when being applied to the electrical system of new locomotives, or may be separately housed and individually annexed to older locomotives which are already in service. In either case, the coil 1 is suitably connected by conductors or wires 3 and 4 to the electrical generating system in a conventional manner, such that an earth fault or a ground condition within the locomotive electrical equipment results in a current flow through the coil 1 which energizes the ground detector relay GR. The ground detector relay GR also includes a reset circuit for coil 2 extending from the upper positive terminal B of a suitable voltage source, such as the low voltage direct current system of the diesel-electric locomotive, through conductor 6, the normally opened contacts of reset push button switch 7, which may be suitably mounted on the engine control panel, through conductors 8 and 9, over normally closed cam operated contact e of stepping relay ST, through conductor 10 to one side of the reset coil 2. The opposite side of reset coil 2 is connected through conductor 11, the normally open contact a of relay GR, the conductors 12, 13 and 14 to the right-hand negative terminal N of the low voltage direct current source. Generally, there is provided a ground relay light, such as lamp 16, for signifying when the ground detector relay has picked up due to an earth fault or ground condition. The ground relay lamp 16 is energized over a circuit extending from the lower positive terminal B of the voltage source through conductors 17, 18 and 19, normally opened contact b or relay GR, through conductors 20 and 21, through voltage dropping resistor 22, to one side of lamp 16. The opposite side of the lamp 16 is connected by conductor 23 to the left-hand terminal N of the voltage source. It will be noted that the normally closed contact c of relay GR may be suitably connected to the main generator excitation circuit, in the conventional manner, by conductors 24 and 25, so that no power can be developed when the contact c becomes interrupted by the picking up of relay GR.

In the development of the present invention, several basic requirements had to be met in order to comply and deal with the existing needs and demands. First, as previously mentioned, the memory device must be compatible with ground detecting apparatus now in use as well as being suitable for new equipment. For example, when the memory device is to be added to existing equipment, there are only two contacts available for use, each of which is normally opened, and one of which is already used for the ground relay indication lamp. Second, the addition of the memory device must not affect the overall efficiency and reliability of detection of the ground detection system or result in a loss of memory or a change in state due to the loss or removal of electrical power.

The memory device includes a stepping relay ST for counting and limiting the number of times the ground detector relay GR may be reset. Preferably, the stepping relay ST may be of Type OCS manufactured by Automatic Electric Company, which is possessed of such attributes as low cost, excellent immunity to shock and vibrations, and high immunity to high voltage surges which are constantly present in diesel-electric locomotives. As shown, the stepping relay includes an operating coil 25 and a plurality of electrical contacts a through e. The electrical contacts a–e either are directly operated by the relay armature, or are actuated by suitable ratchet operated cams, as will be described presently. The stepping relay is preferably an indirect action type wherein the cams are advanced one step at a time to succeeding positions upon the deenergization of the operating coil 25 and releasing of its armature rather than upon the energization of the stepping relay. Normally, the stepping relay also includes a pawl controlled digital wheel (not shown) for numerically indicating the particular position or count of the stepping relay. The memory device also includes a polar sensitive reed relay LS having an operating coil 28 and front and back contacts under control of contact arm a. The reed relay LS is preferably a magnetic stick stay-where-put device so that the interruption of electrical power or energy does not cause a loss of memory or a change of state of its electrical contact arm a.

An "off" normal indication lamp 29 is preferably employed to signify and visually indicate when the memory device or stepping relay has moved from its initial zero position. A surge suppressing unidirectional conducting device, such as diode 30, is connected across the coil 25 to minimize transient voltages developed by the stepping relay which are induced by the coil 25 during normal counting operation of the stepping relay. The diode 30 not only effectively reduces the inductive kick of the stepping relay thereby permitting the utilization of the reed relay contacts, but also insures that the stepping relay will not self-step over its own contacts and provide a false count since it provides a slow flux decay thereby preventing the necessary snap action which is required by relay ST. Similarly, a nonlinear resistor, such as varistor 31, is connected across coil 25 to minimize transient voltage surges developed by the stepping relay during homing operation of the stepping relay. The varistor also provides the required last flux decay for self-stepping necessary for recycling the stepping relay. Further, there is shown a second two-position push button switch 32 having normally closed back contacts for connecting diode 30 to one side of coil 25, and having normally opened front contacts for completing a memory reset circuit for recycling and returning the stepping relay to its initial zero position. Preferably, the push button 32 is either key-operated, or sealed in any suitable manner, so that only authorized personnel, such as maintainers, are permitted to initiate a memory reset or recycling operation, by closing the front contacts of the switch 32, thereby energizing the homing circuit of the stepping relay ST. A resistor 33, the purpose of which will be described in greater detail hereinafter, is shown connected to one side of the coil 28 of the polar sensitive relay LS.

The contact a of stepping relay ST is an armature operated normally open front contact which functions to set the polar sensitive reed relay LS when the stepping relay is energized and its armature is picked up, as will be described in greater detail hereinafter. The contact b of the stepping relay ST is an armature operated normally closed back contact with forms part of the homing circuit for stepping relay ST. The contacts c and d of the stepping relay ST are operated by integrally or individually formed cams 26 and 26'. These cams are operated by a suitable ratchet mechanism which is actuated and stepped by the deenergization of coil 25. The cams 26 and 26' are arranged to close contacts c and d on the first step and to hold these contacts closed for the remaining step positions or counts. The contact e, which forms part of the ground detector reset circuit, cooperates with a ratchet operated cam 27 which functions to open contact e on the final step position. Accordingly, contacts c and d become closed on the first step and remain closed throughout all of the remaining step positions, whereas contact e normally remains closed and only becomes opened on the final step or count of the stepping relay ST.

Proceeding now with a detailed description of the operation of the ground detector system according to the present invention, it is initially assumed that no previous fault has occurred on the electrical equipment of the locomotive and that the various elements and components are in the positions shown in the drawing. Under this condition, the ground detector relay is unlatched and is in its unoperated position so that front contacts a and b are opened while back contact c is closed, thereby completing the circuit to the main generator excitation circuit, and therefore the locomotive may function normally. Also, if no previous ground condition has occurred, the stepping relay is in its initial zero position with the front contact a and back contact b opened and closed, respectively, and the first cam operated contacts c and d are opened while the second cam operated contact e is closed. Under this assumed condition, the polar sensitive reed relay LS assumes its reset position wherein its front contact is opened and its back contact is closed by contact arm a.

Let us now assume that a ground condition appears on the electrical equipment so that current flows through conductors 3 and 4 to the first operating or set coil 1 of the ground detector relay GR. This current causes the set coil 1 to become energized and ground detector relay GR becomes picked up and mechanically latched so that front contacts a and b become closed and back contact c is interrupted. As previously mentioned, the opening of contact c due to the picking up of the ground detector relay GR interrupts the excitation circuit to the main generator so that the locomotive cannot develop power and the engine will remain at idling. The picking up of the ground detector relay and the closing of contact b establishes an energizing circuit for the ground detector relay lamp 16 which extends from the lower positive terminal B, through conductors 16, 18 and 19, over closed contact b of relay GR, through conductors 20 and 21, resistor 22, lamp 16, conductor 23, to the left-hand negative terminal N. Accordingly, the lamp 16 becomes lighted, thereby providing a visual indication of the ground condition.

The closing of contact b of relay GR also establishes an energizing circuit for the stepping relay ST. This circuit extends from the lower positive terminal B through conductors 17, 18 and 19, closed contact b of relay GR, conductors 20, 35 and 36, contact arm a, normally closed back contact of relay LS, conductors 37, 38 and 39, coil 25, lines 40, 41, 42, and 14 to the right-hand negative terminal N. Accordingly, relay ST is picked up and its normally closed back armature contact b becomes opened and its normally opened front armature contact a becomes closed. The closing of contact a of relay ST establishes a forward polarizing circuit for coil 28 of relay LS extending from the lower positive terminal B through conductors 17, 18 and 19, closed contact b of relay GR, conductors 20, 35 and 44, closed contact a of relay ST, conductors 45, 46 and 47, coil 28, conductors 48 and 9, closed contact e of relay ST, conductor 10, reset coil 2, conductor 11, closed contact a of relay GR, conductors 12, 13 and 14 to the right-hand negative terminal N. It will be noted that this circuit permits current to flow through coil 28 of relay LS as well as through coil 2 of relay GR; however, by suitably proportioning the circuit parameters and particularly the resistances of coils 28 and 2, it is possible to operate relay LS to its set or energized position while preventing coil 2 from resetting and releasing relay GR. That is, the energy requirement of reset coil 2 of relay GR is arranged to be much greater than the amount of power required by coil 28 of relay LS. The closing of contact a of relay ST causes a circuit path to be established from the lower positive terminal B through conductors 17, 18 and 19, closed contact b of relay GR, conductors 20, 35 and 44, closed contact a of relay ST, conductors 45, 46 and 50, resistor 33, conductors 51, 52, 13 and 14 to the right-hand negative terminal N. The energization of coil 28 causes the relay to become picked up or set so that contact arm a opens the normally closed back contact and closes the normally opened front contact. The opening of the back contact of relay LS interrupts the energizing circuit to coil 25 of the stepping relay ST. Accordingly, relay ST becomes deenergized and its armature is released so that its front contact a becomes opened and back contact b becomes closed. The opening of front contact a of relay ST does not interrupt the energizing circuit to relay LS since the closing of the front contact by contact arm a of relay LS provides a stick circuit for coil 28. As previously mentioned, the deenergization and release of relay ST initiates the stepping action which operates cams 26, 26' and 27. Thus the dropping of the armature of stepping relay ST advances the cams 26, 26' and 27 one step in a clockwise direction, as viewed in the drawing, so that the stepping relay is moved from its initial zero position to its first step position. The angular rotation of these cams causes the cams 26 and 26' to engage and close contacts c and d, respectively, while the rotational movement and angular displacement imparted to cam 27 has no effect on contact e. For the purposes of convenience, it will be assumed that the stepping relay is a four-step counter; however, it is readily understood that the number of steps or counts of the stepping relay may be greater or less than four, as the situation demands. Accordingly, the cam 27 will not engage and open contact e until the memory device has operated a preselected number of times, namely, in the instant case until the stepping relay has been stepped four times. As previously mentioned, the cams 26 and 26' are so arranged that the contacts c and d will remain closed throughout the four counting steps. The closure of contact c establishes an energizing circuit for the "off" normal memory indication lamp 29 which extends from the lower positive terminal B through conductors 17, 18 and 54, closed contact c of relay ST, conductor 55, lamp 29, conductors 56, 52, 13 and 14 to the right-hand negative terminal N. Accordingly, the lamp 29 becomes lighted thereby indicating that the memory device has moved from its initial zero position. It will be noted that the lamp 29 will remain lighted until appropriate action is taken to return the memory device to its initial zero position, as will be described hereinafter. The closure of contact d by cam 26' conditions a homing circuit for the stepping relay ST which can be employed for stepping and returning the memory device to its initial zero stepping position. The homing circuit may be traced from the lower positive terminal B through conductors 17 and 58, contact b of relay ST, conductor 59, contact a of relay ST, conductor 60, the front contacts of push button switch 32, conductors 61, 38 and 39, coil 25, conductors 40, 41, 42 and 14 to the right-hand negative terminal N.

Let us assume that the ground condition is of a permanent type, such as a low voltage ground during the starting of the engine or a high voltage ground during the operation under power. Accordingly, the appearance of the ground condition will activate ground detector relay GR and will idle the Diesel engine and prevent the locomotive from developing power in the manner as described above. In order to resume normal operation, the engineer may now attempt to reset the ground detector relay GR by depressing the ground reset push button 7. The closing of the contacts of the push button switch 7 establishes the energizing circuit for the reset coil 2 of the ground detector relay GR which extends from the positive terminal B through conductor 6, the push button contacts, conductors 8 and 9, closed contact e of relay ST, conductor 10, reset coil 2, conductor 11, closed contact a of relay GR, conductors 12, 13 and 14 to the negative terminal N. However, if the instant ground condition is of the permanent type, the ground detector relay will not unlatch and release due to the continuous energization of set coil 1 of relay GR. It will be noted that the depression of push button switch 7 also establishes a reverse polarizing circuit to the coil 28 of relay LS which extends from the positive terminal B through conductor 6, over the push button contacts, through conductors 8 and 48, coil 28, conductors 47, 50, resistor 33, conductors 51, 52, 13 and 14 to the negative terminal N. However, the completion of this latter circuit has no effect on relay LS at this time since the holding circuit of relay LS remains energized over closed contact b of relay GR and back contact a of relay LS so that equal and opposite positive potentials appear on each side of coil 28. Accordingly, the depression of push button switch 7 during a permanent ground condition is incapable of resetting the ground detector relay GR, and therefore the locomotive electrical system cannot be restored to normal operation until location and removal of the permanent ground condition has taken place.

Let us assume that the ground condition appeared as a transient ground which momentarily energized the set coil 1 of relay GR and then disappeared. Now if the engineer depresses push button switch 7, the reset coil 2 will be energized over the previously traced reset circuit of relay GR. However, since set coil 1 is no longer energized at this time, the energization of the reset coil 2 effectively unlatches and releases relay GR so that contacts a and b become opened while contact c becomes closed. It will be noted that the closing of contact c of relay GR reestablishes the electrical circuits of the locomotive so that power may be developed and normal operation may follow. The opening of contact a of relay GR insures that excess energy need not be consumed by reset coil 2. The opening of contact b of relay GR interrupts the holding circuit of relay LS and removes the forward polar biasing or positive potential from the right-hand side of coil 28, as viewed in the drawing. Accordingly, the reverse polarizing circuit, extending from positive terminal B, through conductor 6, the closed contacts of push button 7, conductors 8 and 48, coil 28, conductors 47 and 50, resistor 33, conductors 51, 52, 13 and 14 to the right-hand negative terminal N, causes relay LS to reset thereby opening its front contact and closing its back contact by contact arm a. The interruption of contact b of relay GR also interrupts the energizing circuit to lamp 16 so that the ground detector light 16 is extinguished.

The ground detector system operates in a similar manner on the appearance of succeeding ground faults with the exception that the stepping relay ST is advanced one step at a time so that the memory device registers an additional count for each subsequent ground condition.

Let us now assume that three ground conditions have already occurred so that the stepping relay is in its third step position and the memory device indicates a three count. The elements will be substantially in the positions shown in the drawing with the exception that the cams 26, 26' and 27 have advanced to their third step position so that contacts c and d of relay ST are closed, thereby energizing the "off" normal indication lamp 29 and conditioning the homing circuit of relay ST, respectively.

Let us now assume that a fourth ground condition has occurred on the electrical equipment so that the current flowing through conductors 3 and 4 energizes set coil 1, thereby picking up and mechanically latching relay GR in its operated position. Accordingly, contacts a and b of relay GR will close while contact c will open, thereby restricting the Diesel engine to an idle speed. The closing of contact b of relay GR reestablishes the energizing circuit for the ground detection lamp 16, as previously described. The closing of contact b of relay GR also reestablishes the energizing circuit for stepping relay ST, as previously described. The energization of the coil 25 causes the relay ST to pick up, thereby opening and closing the back and front armature contacts b and a, respectively. The closing of front contact a of relay ST reestablishes the forward biasing circuit for the polar sensitive reed relay LS. This latter circuit causes relay LS to become picked up or set so that its back contact becomes opened and its front contact is closed by contact arm a, thereby completing the stick circuit for relay LS, as previously mentioned. The opening of the back contact arm a interrupts the energizing circuit to coil 25 of relay ST. Accordingly, relay ST becomes deenergized and its armature releases so that its front contact a becomes opened and its back contact b becomes closed, thereby conditioning the homing circuit for stepping relay ST. The releasing of stepping relay ST also initiates a cam movement and advances the counter to its fourth or final position. While the angular rotation of cams 26 and 26' does not materially affect the contacts c and d of relay ST, the rotational movement of cam 27 opens its associated contact e, thereby interrupting the reset circuit of relay GR. Accordingly, the depression of push button 7 is incapable of resetting the ground detector relay GR due to the opening of contact e. Similarly, the depression of push button 7 cannot reset polar sensitive relay LS due to the presence of the positive potential on the right-hand side of coil 28, as previously mentioned. Therefore, the opening of contact e provides positive lockout and insures that the ground detector relay GR cannot be unlatched or reset even though set coil 1 is no longer energized. Accordingly, the engine will remain idling and no power can be developed. Therefore, the engineer is limited to four resets of the ground detector relay and thereafter must seek the assistance of an authorized maintainer for restoring the locomotive back to normal operation. For example, after the maintainer has located and repaired the ground fault, the memory device may be returned to its initial zero position.

Since the push button 32 is preferably a key-operated or sealed switch, only a maintainer having a proper key or authority can actuate the push button and initiate a homing action to reset the stepping relay ST to its initial zero position. This insures the utmost in safety to personnel and equipment. The depression of push button 32 closes its front contacts and establishes a homing circuit for stepping relay ST which extends from positive terminal B through conductors 17 and 58, over normally closed armature contact b, through conductor 59, over closed cam operated contact d, through conductor 60, over the back contacts of push button 32, through conductors 61, 38, 39, coil 25, conductors 40, 41, 42 and 14, to the right-hand negative terminal N. Accordingly, the homing circuit initiates a stepping action for recycling and returning the memory device to its zero initial position which is automatically interrupted by the opening of cam operated contact a when the stepping relay assumes its initial zero position, as shown in the drawing. After the stepping relay has assumed its initial zero position, the ground detector relay GR and the polar sensitive relay LS may be reset by the depression of the push button switch 7 so that the ground detection system may again assume the position as shown in the drawing. Thus, the recycling of the present ground detection system after the occurrence of a given number of ground conditions will only be made by authorized personnel after a thorough inspection and corrective measures have been taken to relieve the possible recurrence of the ground faults.

It is further noted that the homing circuit may be actuated after the first count or any count thereafter for recycling and returning the memory device to its initial zero position. For example, such an occasion may arise when a locomotive is brought into the shop for periodic or routine maintenance and, therefore, the maintainer may simply depress push button 32 and recycle the memory device.

Thus, it will be seen that the present invention provides a unique and improved memory device for a ground detection system which counts and limits the number of times a ground detector relay may be reset in accordance with a preformulated program.

It is understood that while my invention has been described in relation to locomotive applications, it is quite obvious that its use is not merely limted thereto, but may be employed in other electrical apparatus and environments which have similar operating needs and requirements. For example, my invention may be used in electric generating and power distributon arrangements or in railway signaling and communication systems.

Although I have herein shown and described only one form of a ground detector system embodying my invention, it is understood that various changes and modifications may be made therein without departing from the spirit and scope of my invention.

Having thus described my invention, what I claim is:

1. In a ground detection system wherein a resettable ground detector relay becomes actuated in response to the appearance of a ground and which may be reset upon the disappearnce of the ground, the combination with said resettable ground detector relay of memory means which counts the number of grounds upon disappearance of each ground and which limits the number of times the ground detector relay may be reset in accordance with a predetermined number of counts.

2. A ground detection system as defined in claim 1, wherein said memory means comprises a stepping relay.

3. A ground detection system as defined in claim 1, wherein an indication means signifies when said memory means is in an off normal condition thereby indicating the appearance of at least one ground.

4. A ground detection system as defined in claim 1; wherein an electromagnetic device protects said memory means against false ground counts and loss of memory.

5. A ground detection system as defined in claim 2, wherein said memory means includes a reset means for stepping and recycling said stepping relay to an initial count.

6. A ground detection system as defined in claim 5, wherein said reset means includes a key-operated push button switch.

7. A ground detection system as defined in claim 2, wherein a unidirectional conducting device provides arc suppression and prevents self-stepping of said stepping relay during the counting operation.

8. A ground detection system as defined in claim 5, wherein a nonlinear resistance device provides arc suppression and self-stepping for said stepping relay during the recycling operation.

9. A ground detection system as defined in claim 7, wherein said unidirectional conducting device comprises a diode.

10. A ground detection system as defined in claim 8, wherein said nonlinear resistance device comprises a varistor.

11. A ground detection system as defined in claim 4, wherein said electromagnetic device comprises a polar sensitive reed relay.

12. In a ground detection system wherein a ground detector relay including both a first winding coupled to a first circuit so that said first winding becomes energized and picks up the ground detector relay when a ground appears on said first circuit and a second winding coupled to a reset circuit so that said second winding may be energized through a reset circuit for releasing the ground detector relay when the ground disappears from said first circuit, the combination with said ground detector relay of a memory limiting means for counting the number of grounds when the grounds disappear from the first circuit and for rendering the reset circuit ineffective for energizing the second winding and releasing the ground detector relay after a preselected number of grounds occur on the first circuit.

13. A ground detection system as defined in claim 12, wherein said memory limiting means includes a stepping relay which is energized through a circuit established by the picking up of the ground detector relay.

14. A ground detection system as defined in claim 13, wherein an indication circuit is established by the energization of said stepping relay.

15. In a ground detection system wherein a ground detector relay including both a first winding coupled to a first circuit so that said first winding becomes energized and picks up the ground detector relay when a ground appears on said first circuit and a second winding coupled to a reset circuit so that said second winding may be energized through a reset circuit for releasing the ground detector relay when the ground disappears from said first circuit, the combination with said ground detector relay of a memory limiting means for counting the number of grounds on the first circuit and for rendering the reset circuit ineffective for energizing the second winding and releasing the ground detector relay after a preselected number of grounds occur on the first circuit, said memory limiting means including a stepping relay which is energized through a circuit established by the picking up of the ground detector relay, and a protective relay for preventing false ground counts is set through a circuit established by the energization of said stepping relay.

16. A ground detection system as defined in claim 15, wherein said energizing circuit for said stepping relay is interrupted by the setting of said protective relay for effecting a ground count.

17. A ground detection system as defined in claim 16, wherein a homing circuit is conditioned by the deenergization of said stepping relay for permitting said stepping relay to be recycled to an initial zero count.

18. A ground detection system as defined in claim 17, wherein the resetting of the ground detector relay resets said protective relay for enabling said stepping relay to be subsequently energized through the circuit established by the picking up of the ground detector relay.

19. A ground detection system as defined in claim 16, wherein said stepping relay disables the reset circuit upon the appearance of said preselected number of grounds on said first circuit and subsequently requires said stepping relay to be recycled to its initial count by energizing said homing circuit for again enabling the reset circuit of the ground detector relay.

References Cited

UNITED STATES PATENTS

| | | | |
|---|---|---|---|
| 2,456,463 | 12/1948 | Starie | 317—22 |
| 2,700,125 | 1/1955 | King et al. | 317—18 |
| 2,758,254 | 8/1956 | Kramer | 317—11 |
| 3,309,571 | 3/1967 | Gilker | 317—18 |
| 3,381,177 | 4/1968 | Allen | 317—22 |

JOHN F. COUCH, Primary Examiner

W. H. BEHA, Jr., Assistant Examiner

U.S. Cl. X.R.

317—22, 23; 340—255